United States Patent Office 3,062,805
Patented Nov. 6, 1962

3,062,805
PEPTIDE SYNTHESIS AND INTERMEDIATES THEREFOR
Noel F. Albertson and Frank C. McKay, East Greenbush, N.Y., assignors to Sterling Drug Inc., New York, N.Y., a corporation of Delaware
No Drawing. Filed Mar. 8, 1957, Ser. No. 644,721
19 Claims. (Cl. 260—112)

This invention relates to a new method for the preparation of alpha-amino carboxamides, especially peptides, and to novel compounds useful in said method. More particularly, this invention relates to a method for preparation of peptides using intermediates in which the cyclopentyloxycarbonyl radical is used as an amine-masking group.

In the synthesis of peptides by the appropriate coupling of an alpha-amino carboxylic acylating agent with an alpha-amino carboxylic acid or peptide, or ester thereof, the satisfactory masking of the alpha-amino group in the acylating agent during the coupling reaction and the subsequent removal of the masking agent present great difficulties because the masking agent must be easily removable and, if it is desired to retain optical activity, racemization of the alpha-amino carboxylic acids and the peptides must of course be avoided. N-(benzyloxycarbonyl) derivatives of alpha-amino carboxylic acylating agents have been used with considerable success for many years in preparing peptides by the well-known Bergmann and Zervas carbobenzoxy synthesis. However, it has long been appreciated that these benzyloxycarbonyl compounds have certain disadvantages which prevent their being completely satisfactory as peptide intermediates. Thus, for example, although it is frequently desirable to have an amino group remain protected by a masking radical under conditions of catalytic hydrogenation, the N-(benzyloxycarbonyl)amino acid derivatives are of course readily cleaved by hydrogen under these conditions to remove the masking carbobenzoxy radical. Moreover, when the N-(benzyloxycarbonyl)amino acid derivatives are cleaved with anhydrous hydrogen bromide or iodide, there is produced benzyl bromide or benzyl iodide, both of which are lachrymators.

It is one of the primary objects of the present invention, therefore, to provide improved means for masking alpha-amino groups in the alpha-amino carboxylic acylation of alpha-amino carboxylic acids and peptides, thereby to afford not only a needed and valuable new alternative to the old methods but also specific advantages over the prior art methods for certain purposes.

Generally speaking, in carrying out the present invention, an amino group in an alpha-amino carboxylic acid or in a peptide is masked by conversion to an N-(cyclopentyloxycarbonyl) derivative, the resulting amine-masked acid is converted to an appropriate functional carboxylic derivative and then used to acylate a lower alkyl, benzyl, or cyclopentyl ester of an alpha-amino carboxylic acid or of a peptide, in accordance with the known general procedures, to produce an N-(cyclopentyloxycarbonyl)peptide ester, and finally the desired peptide is obtained by deesterification and by removal of the amine-masking cyclopentyloxycarbonyl radical, or, if the peptide ester is desired, the deesterification step is omitted.

The initial steps of this process leading to formation of the N-(cyclopentyloxycarbonyl)peptide are entirely analogous to the amine-masking procedures which can be employed for formation of the old N-(benzyloxycarbonyl)peptide esters using a benzyloxycarbonyl masking radical. Thus, for example the preparation of the new alpha-(N-cyclopentyloxycarbonyl)peptides, and esters thereof, of our invention can be readily carried out using the method described by Vaughan at J. Am. Chem. Soc., 73, 3547 (1951), wherein mixed anhydrides of carbonic acid and carboxylic acids are employed. For instance, the preparation of alpha-(N-cyclopentyloxycarbonyl)dipeptide esters can be illustrated by the following reaction.

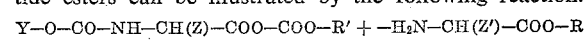

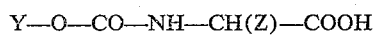

where Z and Z' are the organic radicals of the same or different alpha-amino carboxylic acids having the formula $H_2N$—$CH(Z)$—$COOH$ or $H_2N$—$CH(Z')$—$COOH$, R and R' are lower alkyl, benzyl, or cyclopentyl radicals, and Y represents the cyclopentyl radical, having the structural formula

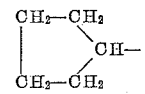

The preparation of alpha-(N-cyclopentyloxycarbonyl)tri- and polypeptide esters can be carried out in similar fashion by using a dipeptide ester or polypeptide ester instead of the amino acid reactant, $H_2N$—$CH(Z')$—$COOR$; or, if desired, an N-(cyclopentyloxycarbonyl)-dipeptide or -polypeptide acylating agent is used.

The mixed anhydrides employed in the above procedure can be readily obtained by treating a lower alkyl, benzyl, or cyclopentyl chlorocarbonate, Cl—CO—O—R', with a triethylamine salt of an alpha-(N-cyclopentyloxycarbonyl)amino carboxylic acid,

Y—O—CO—NH—CH(Z)—COOH in an inert solvent such as toluene or acetone at 0-10° C. for about thirty minutes.

The N-(cyclopentyloxycarbonyl)-alpha-amino carboxylic acids, Y—O—CO—NH—CH(Z)—COOH, and their lower alkyl, benzyl, and cyclopentyl esters are novel compounds which are highly valuable as indicated above as peptide intermediates. These compounds of our invention can be prepared by known general methods, for example by interaction of cyclopentyl alcohol with isocyanates derived from alpha-amino carboxylic acid esters, OCN—CH(Z)—COO—R, in known general manner and saponification of the resulting N-(cyclopentyloxycarbonyl)-alpha-amino carboxylic esters,

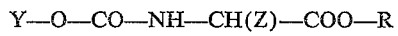

or more desirably by interaction of cyclopentyl chlorocarbonate with an alpha-amino carboxylic acid,

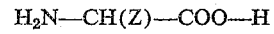

using the familiar Schotten-Baumann technique.

Despite the fact that the introductory steps of our process taken alone would afford no particular advantage over analogous prior art procedures, they are novel and of course make a valuable contribution to our new peptide synthesis as a whole.

The advantages afforded by our new process reside to an important degree in the step of removing the amine-masking radical. In this step, by virtue of the valuable and unexpected properties of the novel N-(cyclopentyloxycarbonyl)peptides and esters thereof, which are described more fully hereinafter, our new process affords readily and conveniently a satisfactory yield of the corresponding peptides or peptide esters. Our procedure for removal of the masking cyclopentyloxy radical does not cause racemization, and is readily applicable to the preparation of both optically active and optically inactive peptides. Described more particularly than above, this step of our new process comprises treating an amine-masked compound of the class consisting of N-(cyclopentyloxycarbonyl)peptides and lower alkyl, benzyl, and cyclopentyl esters thereof, wherein an amino group contains a substituent cyclopentyloxycarbonyl masking radical, with a substantially anhydrous strong acid, thereby removing the said amine-masking radical from the amino group and producing a peptide or a lower alkyl, benzyl, or cyclopentyl ester thereof.

The removal of the amine-masking cyclopentyloxycarbonyl radical is carried out by treating a solution or suspension of the amine-masked peptide or ester thereof in a non-aqueous organic solvent with a substantially anhydrous strong organic or inorganic acid. The strong acid used in this reaction can be, for example, hydrobromic acid, hydriodic acid, hydrochloric acid, sulfuric acid, phosphoric acid, methanesulfonic acid, p-toluenesulfonic acid, or the like. Ordinarily, we prefer to use hydrogen bromide or hydrogen iodide. When these acids are employed, the reaction proceeds rapidly and smoothly at room temperature with evolution of carbon dioxide and the resulting peptide or peptide ester is easily isolated from the reaction mixture. The removal of the cyclopentyloxycarbonyl radical under these conditions is usually complete within about fifteen minutes or less. Other acids, such as hydrogen chloride, remove the cyclopentyloxy radical at a much slower rate. The reaction medium can be any suitable substantially anhydrous organic liquid which does not interfere with the reaction, for example nitromethane, acetic acid, benzene, chloroform, carbon tetrachloride, ethyl acetate, and dioxane.

It is usually preferred to carry out the mask-removing reaction at low or moderate temperatures since as is well-known many peptides have a tendency to be adversely affected by excessive heat. For this reason, and also since the application of heat is not necessary, we ordinarily carry out the removal of the cyclopentylcarbonyl radical at or near room temperature, for example, at about 20–30° C.

We have found that a very satisfactory and convenient general procedure for carrying out the removal of the cyclopentyloxycarbonyl radical is to bubble hydrogen bromide into a solution or suspension of the N-(cyclopentyloxycarbonyl)peptide, or ester thereof, at room temperature in anhydrous nitromethane.

The amine-masked N-(cyclopentyloxycarbonyl)peptides and N-(cyclopentyloxycarbonyl)peptide esters which are obtained as intermediates in our above-described process are novel and valuable products and constitute one aspect of the instant invention. These compounds in many instances are white solids, while other members of this group are usually obtained as viscous syrups. In general, they are insoluble in water and aliphatic hydrocarbons, and soluble in most of the common polar organic solvents such as alcohols, ketones, esters, aliphatic carboxylic acids, and dimethylformamide. The N-(cyclopentyloxycarbonyl)peptides are generally higher melting than the corresponding esters and the former, due to the carboxyl groups, are soluble in organic and inorganic bases. The esters are readily purified by dissolving in warm ethyl acetate and adding n-hexane until faint turbidity persists and then cooling to cause separation of the purified product.

An obvious advantage afforded by our invention is that it is a desirable additon to the available procedures for peptide synthesis for use in instances where it is inconvenient or impractical to employ the known methods. An especially advantageous feature of our invention is that by use in conjunction with the benzyloxycarbonyl method it provides means for preferentially removing one of the two types of amine-masking radicals involved. Thus, for example, in a peptide containing two amino groups which are to be masked, the cyclopentyloxycarbonyl radical can be used to mask one amino group and the benzyloxycarbonyl radical can be used to mask the other amino group. The benzyloxycarbonyl radical can be readily removed by catalytic hydrogenation, which does not affect the cyclopentyloxycarbonyl radical. The cyclopentyloxycarbonyl radical can subsequently be removed by the use of anhydrous hydrogen bromide.

Our invention is illustrated by the following examples without, however, being limited thereto.

EXAMPLES

A. *Cyclopentyl Chlorocarbonate*

Phosgene was condensed at the temperature of a Dry Ice-acetone bath until an amount 50 percent in excess of the theoretically required amount was collected. Cyclopentyl alcohol was then dripped into the liquid phosgene at 0° C. The reaction mixture was allowed to stand four hours at room temperature (about 25° C.) and the excess phosgene was removed under reduced pressure at room temperature. The residual product, which was cyclopentyl chlorocarbonate, was used as described below without further purification.

B. *N-(Cyclopentyloxycarbonyl)-Alpha-Amino Carboxylic Acids,* Y—O—CO—NH—CH(Z)—COO—H These compounds were prepared using the well-known Schotten-Baumann technique by interaction of approximately equivalent amounts of cyclopentyl chlorocarbonate, Y—O—CO—Cl, and an alpha-amino carboxylic acid, $H_2N$—CH(Z)—COOH, in the presence of an alkali. The beta-alanine derivative was prepared in similar fashion. The following compounds were prepared by this method.

(1) N-(cyclopentyloxycarbonyl)glycine; M.P. 77–80° C.; yield, 69%. *Analysis.*—Nitrogen: Calculated for $C_8H_{13}NO_4$, 7.48; found, 7.44%. Neutral equivalent: Calculated, 187; found, 190.

(2) N-(cyclopentyloxycarbonyl)-DL-valine; M.P. 100–102° C.; yield, 75%. *Analysis.*—Nitrogen: Calculated for $C_{11}H_{19}NO_4$, 6.11%; found, 6.18%. Neutral equivalent: Calculated, 229; found, 228.

(3) N-(cyclopentyloxycarbonyl) - DL - alanine; M.P. 120–123° C.; yield, 74%. *Analysis.*—Nitrogen: Calculated for $C_9H_{15}NO_4$, 6.96%; found, 7.02%. Neutral equivalent: Calculated, 201; found, 200.

(4) N - (cyclopentyloxycarbonyl) - beta-alanine; M.P. 54–58° C.; yield, 66%. *Analysis.*—Nitrogen: Calculated for $C_9H_{15}NO_4$, 6.96%; found, 7.00%. Neutral equivalent: Calculated, 201; found, 199.

(5) N-(cyclopentyloxycarbonyl)-DL-methionine; M.P. 111–113° C.; yield, 71%. *Analysis.*—Nitrogen: Calculated for $C_{11}H_{19}NO_4S$, 5.36%; found, 5.38%. Neutral equivalent: Calculated, 261; found, 258.

(6) N-(cyclopentyloxycarbonyl)-L-glutamic acid gamma-ethyl ester; M.P. 62–66° C.; yield, 64%. *Analysis.*—Nitrogen: Calculated for $C_{13}H_{21}NO_6$, 4.88%; found, 4.95%. Neutral equivalent: 287; found, 288.

(7) N-(cyclopentyloxycarbonyl)-2-phenylglycine; M.P. 93–95° C.; yield, 83%. *Analysis.*—Nitrogen: Calculated for $C_{14}H_{17}NO_4$, 5.32%; found, 5.39%. Neutral equivalent: Calculated, 263; found, 263.

(8) N-(cyclopentyloxycarbonyl)-DL-serine; M.P. 118–110° C.; yield, 62%. *Analysis.*—Nitrogen: Calculated for $C_9H_{15}NO_5$, 6.44%; found, 6.32%. Neutral equivalent: Calculated, 217; found, 219.

(9) N-(cyclopentyloxycarbonyl) - L - asparagine; M.P. 177–179° C.; yield, 66%. *Analysis.*—Nitrogen: Calculated for $C_{10}H_{16}N_2O_5$, 11.47%; found, 11.51%. Neutral equivalent: Calculated, 244; found, 245.

(10) N-(cyclopentyloxycarbonyl) - L - leucine; yellow syrup; yield, 82%.

(11) N-(cyclopentyloxycarbonyl)-L-valine; pale yellow syrup; yield, 67%.

(12) N-(cyclopentyloxycarbonyl)-DL-proline; pale yellow syrup; yield, 95%.

(13) Alpha, epsilon-di-(N-cyclopentyloxycarbonyl)-L-lysine; M.P. 93–100°; yield, 57%. *Analysis.*—Nitrogen: Calculated for $C_{18}H_{30}N_2O_6$, 7.56%; found, 7.35%. Neutral equivalent: Calculated, 370; found, 375.

(14) O-acetyl-N-(cyclopentyloxycarbonyl)-L-tyrosine; M.P. 117–121°; yield, 82%.

(15) N-(cyclopentyloxycarbonyl) - L - phenylalanine; M.P. 123–127° C.; yield, 58%. *Analysis.*—Nitrogen: Calculated for $C_{15}H_{19}NO_4$, 5.05%; found, 4.97%.

(16) N-(cyclopentyloxycarbonyl)-DL-isoleucine; M.P. 95–99° C.; yield, 82%. *Analysis.*—Nitrogen: Calculated for $C_{12}H_{21}NO_4$, 5.76%; found, 5.77%. Neutral equivalent: Calculated, 243; found, 245.

(17) N-(cyclopentyloxycarbonyl)-DL-norleucine; M.P. 98–102° C.; yield, 69%. *Analysis.*—Nitrogen: Calculated for $C_{12}H_{21}NO_4$, 5.76%; found, 5.77%. Neutral equivalent: Calculated, 243; found, 245.

(18) N-(cyclopentyloxycarbonyl)-DL - 2 - aminopelargonic acid; M.P. 99–101° C.; yield, 87%. *Analysis.*—Nitrogen: Calculated for $C_{15}H_{27}NO_4$, 4.91%; found, 4.73%. Neutral equivalent: Calculated, 285; found, 287.

(19) N-(cyclopentyloxycarbonyl)-L-isoleucine; colorless hexagonal prisms; yield, 83%.

C. *N-(Cyclopentyloxycarbonyl)Peptides and Esters Thereof*

These compounds were prepared as follows. The triethylamine salt of the N-(cyclopentyloxycarbonyl)-alpha-amino carboxylic acid,

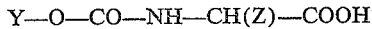

was reacted with isobutyl chlorocarbonate in acetone at −10° C. for thirty minutes to form the mixed anhydride,

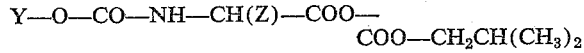

A chloroform solution of the alpha-amino carboxylic acid ester or peptide ester to be acylated was then added and the reaction mixture was allowed to warm to room temperature and stand overnight (about fifteen hours). The desired amine-masked N-(cyclopentyloxycarbonyl)peptide ester was separated from the reaction mixture by washing the reaction mixture with water, dilute hydrochloric acid, and dilute aqueous sodium bicarbonate solution, drying, and diluting with petroleum ether to crystallize the product. The ester was saponified with aqueous alkali to obtain the corresponding N-(cyclopentyloxycarbonyl)peptide.

Proceeding in accordance with the above procedure, there were prepared the following compounds.

(1) N - (cyclopentyloxycarbonyl)glycyl-DL-phenylalanine methyl ester; M.P. 104–105° C.; yield, 61%. *Analysis.*—Nitrogen: Calculated for $C_{18}H_{24}N_2O_5$, 8.03%; found, 8.07%.

(2) N - (cyclopentyloxycarbonyl)glycyl-DL-phenylalanine; M.P. 129–131° C.; yield, 89%. *Analysis.*—Nitrogen: Calculated, 8.37%; found, 8.20%. Neutral equivalent: Calculated, 335; found, 334.

(3) Alpha - (N-cyclopentyloxycarbonyl)-DL-phenylalanylglycine methyl ester; M.P. 113–115° C.; yield, 71%. *Analysis.*—Nitrogen: Calculated for $C_{19}H_{26}N_2O_5$, 7.73%; found, 7.56%.

(4) N-cyclopentyloxycarbonyl)-L-valylglycine methyl ester; M.P. 149–154° C.; yield, 68%. *Analysis.*—Nitrogen: Calculated, 9.33%; found, 8.94%.

(5) N-(cyclopentyloxycarbonyl)-beta-alanyl-DL-phenylalanine methyl ester; M.P. 102–105° C.; yield, 86%. *Analysis.*—Nitrogen: Calculated for $C_{19}H_{26}N_2O_5$, 7.73%; found, 7.68%.

(6) N-(cyclopentyloxycarbonyl)-beta-alanyl-DL-phenylalanine; M.P. 140–145° C.; yield, 78%. *Analysis.*—Nitrogen: Calculated, 8.03%; found 8.09%. Neutral equivalent: Calculated, 348; found, 348.

(7) N - (cyclopentyloxycarbonyl) - DL - alanylglycine methyl ester; M.P. 84–87° C.; yield, 68%. *Analysis.*—Nitrogen: Calculated for $C_{12}H_{20}N_2O_5$, 10.29%; found, 10.33%.

(8) N - (cyclopentyloxycarbonyl) - DL - alanylglycine; M.P. 158–159° C.; yield, 77%. *Analysis.*—Nitrogen: Calculated, 10.83%; found, 10.92%. Neutral equivalent: Calculated, 258; found, 255.

(9) N - (cyclopentyloxycarbonyl) - DL - valylglycine methyl ester; M.P. 135–136° C.; yield, 68%. *Analysis.*—Nitrogen: Calculated for $C_{14}H_{24}N_2O_5$, 9.32%; found, 9.46%.

(10) N - (cyclopentyloxycarbonyl) - DL - valylglycine; M.P. 155–158° C.; yield, 75%. *Analysis.*—Nitrogen: Calculated, 9.77%; found, 9.83%.

(11) N-(cyclopentyloxycarbonyl)-L-leucyl - L - leucine ethyl ester; M.P. 139–140° C.; yield 64%. *Analysis.*—Nitrogen: Calculated for $C_{20}H_{36}N_2O_5$, 7.28%; found, 7.33%.

(12) N-(cyclopentyloxycarbonyl) - DL - norleucylglycine cyclopentyl ester; M.P. 101–102° C., yield, 69%. *Analysis.*—Nitrogen: Calculated, 7.60%; found, 7.61%.

(13) N-(cyclopentyloxycarbonyl) - DL - methioninylglycine methyl ester; M.P. 98–100° C.; yield, 71%. *Analysis.* — Nitrogen: Calculated for $C_{14}H_{24}N_2O_5S$, 8.43%; found, 8.38%.

(14) N-(cyclopentyloxycarbonyl) - DL - methioninylglycine; M.P. 150–153° C.; yield, 93%. *Analysis.*—Nitrogen: Calculated, 8.80%; found, 8.81%. Neutral equivalent; Calculated, 318; found, 320.

(15) N-(cyclopentyloxycarbonyl) - L - valyl-L-leucylglycine methyl ester (by acylating L-leucylglycine methyl ester); M.P. 172–177° C. (for crude product); yield, 88%. *Analysis.*—Nitrogen: Calculated for $C_{20}H_{35}N_3O_6$, 10.16%; found, 10.47%.

(16) N-(cyclopentyloxycarbonyl) - L - valyl-L-leucylglycine; M.P. 82° C. (for crude product); yield, 82%. *Analysis.* — Nitrogen: Calculated, 10.52%; found, 10.49%.

(17) N-(cyclopentyloxycarbonyl) - DL - prolylglycine methyl ester; yellow syrup; yield, 70%.

(18) N-(cyclopentyloxycarbonyl)-DL - prolylglycine; M.P. 190–192° C.; yield, 92%. *Analysis.*—Nitrogen: Calculated, 9.86%; found, 9.94%. Neutral equivalent: Calculated, 284; found, 273.

(19) N-(cyclopentyloxycarbonyl) - DL - prolyl - DL-phenylalanylglycine methyl ester (prepared by acylation of DL-phenylalanylglycine ester); orange syrup; yield, 89%.

(20) N-(cyclopentyloxycarbonyl) - DL - prolyl - DL-phenylalanylglycine; 99% yield of syrupy product, 31% of which crystallized on trituration with diethyl ether to yield a solid melting at 105–143° C. *Analysis.*—Nitrogen: Calculated, 9.74%; found, 9.60%. Neutral equivalent: Calculated, 431; found, 411.

(21) N-(cyclopentyloxycarbonyl) - L-isoleucylglycine methyl ester; M.P. 144–146° C.; yield, 52%. *Analysis.*—Nitrogen: Calculated, 8.91%; found, 8.96%.

(22) N-(cyclopentyloxycarbonyl) - L-isoleucylglycine; M.P. 135–138° C.; yield, 78%. *Analysis.*—Nitrogen: Calculated, 9.33%; found, 9.21%. Neutral equivalent: Calculated, 300; found, 308.

(23) N-(cyclopentyloxycarbonyl) - DL - norvalylglycine methyl ester; M.P. 93–95° C.; yield, 66%. *Analysis.*—Nitrogen: Calculated, 9.33%; found, 9.29%.

(24) N-(cyclopentyloxycarbonyl) - DL - norvalylglycine cyclopentyl ester; M.P. 88–90° C.; yield, 63%. *Analysis.*—Nitrogen: Calculated, 7.91%; found, 7.96%.

(25) N-(cyclopentyloxycarbonyl) - DL - norvalylglycine; M.P. 125–128° C.; yield, 72%. *Analysis.*—Nitrogen: Calculated, 9.79%, found, 9.90%. Neutral equivalent: Calculated, 286; found, 291.

(26) N-(cyclopentyloxycarbonyl) - L - valyl-L-serine methyl ester; M.P. 149–155° C.; yield, 44%. *Analysis.*—Nitrogen: Calculated, 8.48%; found, 8.25%.

(27) N-(cyclopentyloxycarbonyl) - L - valyl-L-serine; M.P. 183–186° C.; yield, 68%. *Analysis.*—Nitrogen: Calculated, 8.85%; found, 8.78%.

(28) N-(cyclopentyloxycarbonyl) - L - asparaginyl-L-glutamic acid dicyclopentyl ester; M.P. 163–167° C. *Analysis.*—Nitrogen: Calculated, 8.25%; found, 8.15%.

(29) N-(cyclopentyloxycarbonyl)glycyl - β - alanyl-L-leucyl-D-threonine methyl ester (by acylating L-leucyl-D-threonine ester with N-(cyclopentyloxycarbonyl)glycyl-beta-alanine) M.P., 162–165° C.; yield, 27%.

(30) N-(cyclopentyloxycarbonyl)glycyl - beta - alanyl-L-leucyl-D-threonine; M.P. 158–164° C.; yield, 44%. Analysis. — Nitrogen: Calculated for $C_{21}H_{36}N_4O_8$, 11.85%; found, 11.75%. Neutral equivalent: Calculated, 472; found, 482.

(31) O-acetyl-N-(cyclopentyloxycarbonyl) - L-tyrosylglycine methyl ester; M.P. 143–147° C.; yield, 57%. *Analysis.*—Nitrogen: Calculated for $C_{20}H_{26}N_7O_7$, 6.88%; found, 6.75%.

(32) N-(cyclopentyloxycarbonyl)glycyl - DL - phenylalanine cyclopentyl ester; yellow syrup; yield, 89%.

(33) N-(cyclopentyloxycarbonyl)glycyl - O - acetyl-L-tyrosine cyclopentyl ester; yellow syrup; yield, 90%.

(34) N-(cyclopentyloxycarbonyl) - L - leucylglycine cyclopentyl ester; M.P., 81–82° C.; yield, 70%. *Analysis.*—Nitrogen: Calculated for $C_{19}H_{32}N_2O_5$, 7.59%; found, 7.57%.

(35) N-(cyclopentyloxycarbonyl)glycylglycine methyl ester; M.P. 67–70° C.; yield, 62%. *Analysis.*—Nitrogen: Calculated, 10.85%; found, 10.82%.

(36) N - (cyclopentyloxycarbonyl)glycyl - L - leucine methyl ester; viscous yellow syrup; yield, 75%.

(37) N - (cyclopentyloxycarbonyl) - DL - 2 - aminophenylacetylglycine cyclopentyl ester; M.P. 118–122° C.; yield, 84%. *Analysis.*—Nitrogen: Calculated, 7.21%; found, 7.17%.

(38) N-(cyclopentyloxycarbonyl) - 6 - aminocaproylglycine cyclopentyl ester; M.P. 72–75° C.; yield, 76%. *Analysis.*—Nitrogen: Calculated, 7.18%; found, 7.18%.

(39) N - (cyclopentyloxycarbonyl) - L - valylglycine cyclopentyl ester; M.P. 132–134° C.; yield, 77%. *Analysis.*—Nitrogen: Calculated, 7.91%; found, 7.79%.

(40) N-(cycolpentyloxycarbonyl)glycyl - L - leucylglycine cyclopentyl ester; M.P. 124–128° C.; yield, 63%. This was prepared by coupling N-(cyclopentyloxycarbonyl)glycine with the dipeptide ester. *Analysis.*—Nitrogen: Calculated, 9.88%; found, 9.95%.

(41) N-(cyclopentyloxycarbonyl) - DL - isoleucyl-DL-valine methyl ester; M.P. 100–111° C.; yield, 61%. *Analysis.*—Nitrogen: Calculated, 7.86%, found, 7.74%.

(42) N-(cyclopentyloxycarbonyl) - DL - isoleucyl-DL-serine methyl ester; M.P. 100–107° C.; yield, 63%. *Analysis.*—Nitrogen: Calculated, 8.13%; found, 8.00%.

(43) N - (cyclopentyloxycarbonyl) - L - isoleucyl - L-histidine methyl ester; M.P. 199–203° C.; yield, 44%. Analysis. — Nitrogen: Calculated, 14.21%; found, 13.50%.

D. Peptides and Peptide Esters

These compounds were prepared by treatment of the corresponding N-(cyclopentyloxycarbonyl) peptides, or ester thereof, obtained as above-described, with anhydrous hydrogen bromide. The hydrogen bromide was bubbled into a suspension or solution of the amine-masked peptide in nitromethane or acetic acid for five to ten minutes, and the reaction mixture was then allowed to stand for three hours. The mixture was then diluted with ethyl ether and filtered and the solid product collected in this manner was washed with diethyl ether. The peptide hydrobromide thus obtained was converted to the free peptide by dissolving it in methanol and then adding ammonium hydroxide to precipitate the peptide, which was then collected and recrystallized from water-methanol or water-ethanol solution. The peptide ester hydrobromides were preferably recrystallized from ethanol-ether or isopropyl alcohol-ether mixtures.

Proceeding in the above-described manner, the following peptides were prepared. The nitrogen analysis in each case as determined by titration in acetic acid with perchloric acid is designated N(AP) and as determined by the Kjeldahl method is designated as N(K).

(1) Glycyl - DL - phenylalanine; M.P. 273–275° C. (dec.); yield, 73%. Analysis. — Nitrogen: For $C_{11}H_{14}N_2O_3$, N(AP) calculated, 6.31%. Found, 6.04%. N(K) calculated, 12.62%. Found, 12.55%.

(2) DL-valylglycine; M.P. 247° C. (dec.); yield, 60%. *Analysis.*—Nitrogen: For $C_7H_{14}N_2O_3$, N(AP) calculated, 8.04%. Found, 7.92%. N(K) calculated, 16.08%. Found, 16.04%.

(3) L-valyl-L-leucylglycine; M.P. 237–240° C. (dec.); yield, 56%. *Analysis.*—Nitrogen: For $C_{13}H_{25}N_3O_4$, N(AP) calculated, 4.87%. Found, 4.67%. N(K) calculated, 14.62%. Found, 14.38%.

(4) DL-alanylglycine; M.P. 229–231° C. (dec.); yield, 80%. *Analysis.*—Nitrogen: For $C_5H_{10}N_2O_3$, N(AP) calculated, 9.59%. Found, 9.50%. N(K) calculated, 19.17%. Found, 18.94%.

(5) Beta-alanyl-DL-phenylalanine; M.P. 253–255° C. (dec.); yield, 71%. Analysis. — Nitrogen: For $C_{12}H_{16}N_2O_3$, N(AP) calculated, 5.93%. Found, 5.68%. N(K) calculated, 11.85%. Found, 11.87%.

(6) DL-prolylglycine; M.P. 232–236° C. (dec.); yield, 69%. *Analysis.*—Nitrogen: For $C_7H_{12}N_2O_3$, N(AP) calculated, 8.13%. Found, 8.02%.

(7) L-isoleucyl-L-asparagine; M.P. 231–236° C. (dec.); yield, 57%. $[\alpha]_D^{25} = +21.2°$ (5% soln. in water). *Analysis.*—Nitrogen: For $C_{10}H_{19}N_3O_4$, N(AP) calculated, 5.71%. Found, 5.73%. N(K) calculated, 17.13%. Found, 17.22%.

(8) Glycylglycine methyl ester hydrobromide; M.P. 165–172° C.; yield, 83%. *Analysis.*—Nitrogen: Calculated, 12.34%. Found, 12.46%.

(9) Glycyl-L-leucine methyl ester hydrobromide; M.P. 151–153° C.; yield, 62%. *Analysis.*—Bromine: Calculated, 28.22%. Found, 28.38%.

The three following peptides were prepared by simultaneous removal of an N-(cyclopentyloxycarbonyl) masking group and a cyclopentyl ester group by treating overnight (about fifteen hours) at room temperature (about 25° C.) with anhydrous hydrogen bromide in anhydrous acetic acid.

(10) Glycyl-DL-phenylalanine; M.P. 270–271° C.; yield, 68%. *Analysis.*—Nitrogen: For $C_{11}H_{14}N_2O_3$, N(AP) calculated, 6.31%. Found, 6.02%. N(K) calculated, 12.62%. Found, 12.45%.

(11) DL-2-aminophenylacetylglycine; M.P. 241–242° C.; yield, 88%. *Analysis.*—Nitrogen: For $C_{10}H_{12}N_2O_3$, N(AP) calculated, 6.73%. Found, 6.78%. N(K) calculated, 13.46%. Found, 13.24%.

(12) DL-norleucyl glycine; M.P. 225–227° C.; yield, 78%. *Analysis.*—Nitrogen: For $C_8H_{16}N_2O_3$, N(AP) calculated, 7.44%. Found, 7.39%.

E. Preferential Masking Group Removal

The following example illustrates the use of our invention in removing the benzyloxycarbonyl amine-masking radical while leaving the cyclopentyloxycarbonyl amine-masking radical intact.

17 g. of N-(cyclopentyloxycarbonyl)glycyl-L-leucyl-epsilon-(benzyloxycarbonyl)-L-lysine hydrazide is added to 150 ml. of acetic acid and the mixture is subjected to catalytic hydrogenation using a palladium hydrogenation catalyst. There is thus produced N-(cyclopentyloxycarbonyl)glycyl-L-epsilon-L-lysine hydrazide diacetate.

In the foregoing examples, as will be readily appreciated from the disclosures herein, the use of different optical forms of the starting alpha-amino carboxylic acid derivatives, for instance the use of a D-form instead of a DL-form, or an L-form instead of a DL-form or the like, leads to production of the corresponding optical form of the peptide or peptide ester product.

We claim:

1. The process which comprises: acylating the free amino group of a compound of the group consisting of lower alkyl, benzyl, and cyclopentyl esters of alpha-amino carboxylic acids and lower alkyl, benzyl, and cyclopentyl esters of peptides by treatment with an N-(cyclopentyloxycarbonyl)-amino carboxylic acylating agent; deesterifying the resulting amine-masked N-(cyclopentyloxycarbonyl)peptide ester; and treating the N-(cyclopentyloxycarbonyl)peptide thus obtained with a substantially anhydrous strong acid to remove the cyclopentyloxycarbonyl radical and produce the corresponding peptide.

2. The process which comprises: acylating the free amino group of a compound of the group consisting of lower alkyl, benzyl, and cyclopentyl esters of alpha-amino carboxylic acids and lower alkyl, benzyl, and cyclopentyl esters of peptides by treatment with an N-(cyclopentyloxycarbonyl)-amino carboxylic acylating agent; and treating the resulting amine-masked N-(cyclopentyloxycarbonyl)peptide ester with a substantially anhydrous strong acid to remove the cyclopentyloxycarbonyl radical and produce the corresponding peptide ester.

3. The process which comprises: acylating the free amino group of a lower alkyl ester of an alpha-amino carboxylic acid by treatment with an N-(cyclopentyloxycarbonyl)amino carboxylic acylating agent; deesterifying the resulting N-(cyclopentyloxycarbonyl)dipeptide ester; and treating the N-(cyclopentyloxycarbonyl)dipeptide thus obtained with a substantially anhydrous strong acid to remove the cyclopentyloxycarbonyl radical and produce the corresponding dipeptide.

4. The process which comprises: acylating the free amino group of a lower alkyl ester of an alpha-amino carboxylic acid by treatment with an N-(cyclopentyloxycarbonyl)amino carboxylic acylating agent; and treating the resulting amine-masked N-(cyclopentyloxycarbonyl) dipeptide lower alkyl ester with a substantially anhydrous strong acid to remove the cyclopentyloxycarbonyl radical and produce the corresponding dipeptide lower alkyl ester.

5. The process which comprises treating an amine-masked compound of the group consisting of N-(cyclopentyloxycarbonyl)peptides and lower alkyl, benzyl, and cyclopentyl esters thereof with a substantially anhydrous strong acid, thereby removing the cyclopentyloxycarbonyl radical from said amine-masked compound.

6. The process which comprises treating an N-(cyclopentyloxycarbonyl)dipeptide with a substantially anhydrous strong acid, thereby removing the cyclopentyloxycarbonyl radical and producing the corresponding dipeptide.

7. The process which comprises treating an N-(cyclopentyloxycarbonyl)peptide with substantially anhydrous hydrogen bromide, thereby removing the cyclopentyloxycarbonyl radical and producing the corresponding peptide.

8. A compound of the group consisting of amine-masked peptides and lower alkyl, benzyl, and cyclopentyl esters thereof, wherein an amino group of said compound contains a substituent cyclopentyloxycarbonyl radical.

9. An amine-masked peptide wherein an amino group of said peptide contains a substituent cyclopentyloxycarbonyl radical.

10. An amine-masked dipeptide wherein an amino group of said dipeptide contains a substituent cyclopentyloxycarbonyl radical.

11. A compound of the group consisting of N-(cyclopentyloxycarbonyl)-alpha-amino carboxylic acids and lower alkyl, benzyl, and cyclopentyl esters thereof.

12. A lower alkyl ester of an N-(cyclopentyloxycarbonyl)-alpha-amino carboxylic acid.

13. An N-(cyclopentyloxycarbonyl)-alpha-amino carboxylic acid.

14. The process which comprises acylating a compound of the group consisting of lower alkyl, benzyl, and cyclopentyl esters of alpha-amino carboxylic acids and lower alkyl, benzyl and cyclopentyl esters of peptides by treatment with cyclopentylchlorocarbonate.

15. N-(cyclopentyloxycarbonyl)glycine.
16. N-(cyclopentyloxycarbonyl)-L-isoleucine.
17. N-(cyclopentyloxycarbonyl)-L-phenylalanine.
18. N-(cyclopentyloxycarbonyl)-L-valine.
19. N-(cyclopentyloxycarbonyl)-L-asparagine.

References Cited in the file of this patent

Wessley: Chem. Abs., vol. 23, p. 1618 (1929).
Anson: Advances in Protein Chem., vol. 12, pp. 468–70 (1957).